United States Patent [19]

Miyazawa

[11] 3,940,334
[45] Feb. 24, 1976

[54] METHOD FOR SEPARATING OIL FROM WATER

[75] Inventor: Tadashi Miyazawa, Tokyo, Japan

[73] Assignees: Kayaba Industry Co., Ltd.; Mitsubishi Industries, Ltd., both of Tokyo; E. C. Chemical Industries Co., Ltd., Osaka, all of Japan

[22] Filed: Mar. 18, 1974

[21] Appl. No.: 451,763

[30] Foreign Application Priority Data
Mar. 16, 1973  Japan.............................. 48-30595

[52] U.S. Cl. .................... 210/21; 203/47; 210/43; 210/54; 210/73 W
[51] Int. Cl.² ........................................ B01D 11/04
[58] Field of Search ............ 210/21, 51, 59, 66, 43, 210/730 W, 54; 252/328, 329, 331, 346; 203/47

[56] References Cited
UNITED STATES PATENTS

| | | | |
|---|---|---|---|
| 2,502,485 | 4/1950 | Saunders et al. | 203/47 |
| 2,588,794 | 3/1952 | Barton | 210/21 |
| 2,702,794 | 2/1955 | Kellogg | 252/329 |
| 2,919,246 | 12/1959 | DeBoer et al. | 210/21 |
| 3,446,732 | 5/1969 | Gasser et al. | 210/21 |
| 3,715,306 | 2/1973 | Mar | 210/21 |
| 3,756,959 | 9/1973 | Vitalis et al. | 252/358 |
| 3,799,872 | 3/1974 | Hargis et al. | 210/21 |
| 3,872,000 | 3/1975 | Hamada et al. | 210/54 |

FOREIGN PATENTS OR APPLICATIONS
102,782   12/1973   Japan

*Primary Examiner*—Charles N. Hart
*Assistant Examiner*—Peter A. Hruskoci
*Attorney, Agent, or Firm*—Saul Jecies

[57] ABSTRACT

A method for separating oil from water, wherein, in order to simplify the treatment processes, to improve separation efficiency, and to make possible the recycling of added solvents, in the course of separation treatment of oil from waste water containing fats and oils, paraffinic hydrocarbons of low specific gravities, as extractive solvents for fats and oils, and inorganic or organic coagulants are added to the waste water; the mixture is then stirred and allowed to stand; the oil-containing scum separating as an upper layer is then removed so as to separate the oil from water, and furthermore, the solvent previously added is recovered from the oil-containing scum so removed by means of distillation.

9 Claims, 1 Drawing Figure

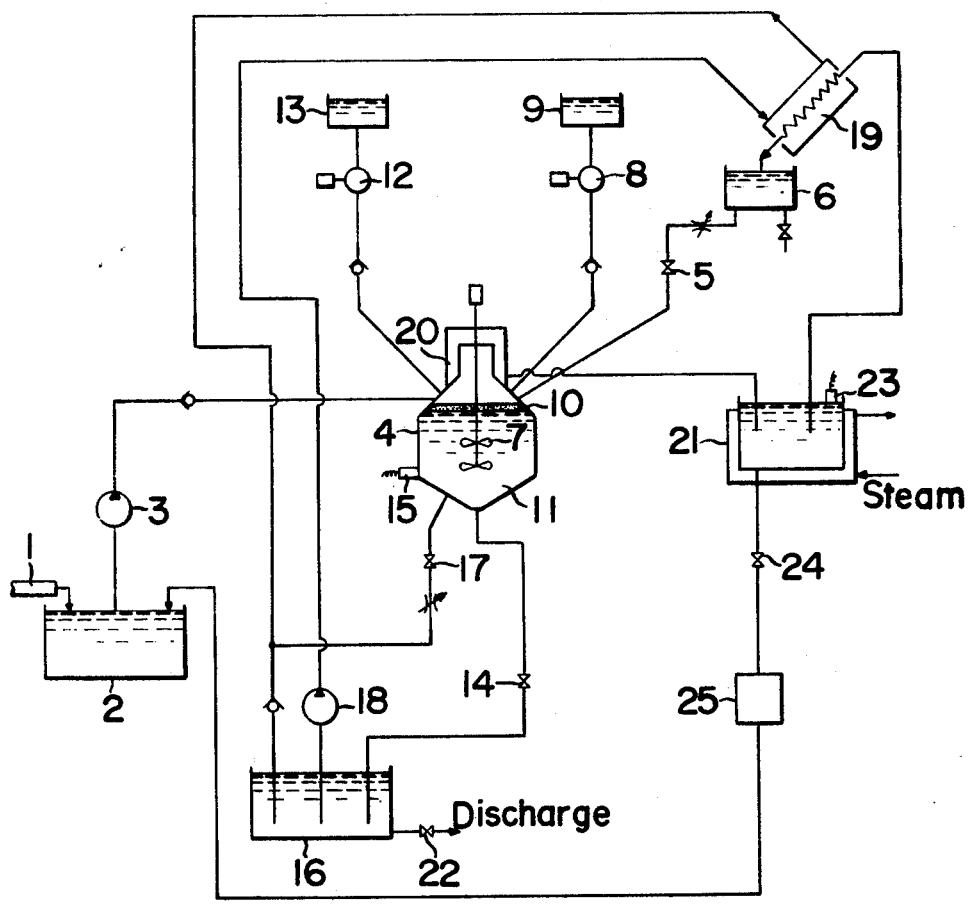

3,940,334

METHOD FOR SEPARATING OIL FROM WATER

BACKGROUND OF THE INVENTION

This invention is a method for separating fats and oils contained in waste water to yield clean water which can be discharged either be re-used or discharged without harming the environment.

Since waste water from plants generally contains various fats and oils that tend to contaminate surroundings and disrupt the environment if discharged into rivers, lakes, etc., these fats and oils should be removed before discharge. In general, however, such fats and oils are present in waste water at levels from 100 parts per million to several tens of thousand PPM in the form of an emulsion, and thus the separation and extraction of such fats and oils from waste water are difficult to carry out.

Extensive studies have therefore been conducted in various fields, and various methods have been proposed. However, in all of these processes, numerous drawbacks may be cited as follows:
1. Large-scale equipment is required.
2. Additives required for separation are difficult to recover, resulting in high operating costs.
3. Knowledge of chemistry is required, and thus the processes can be employed only with difficulty by smaller companies.
4. Separation of fats and oils is not complete, and tend to be discharged in small amounts together with the treated water.

In view of the above, no satisfactory processes are as yet available, and effective means for the separation of fats and oils from waste water are much desired.

SUMMARY OF THE INVENTION

The purpose of the present invention is to provide a highly efficient process for the separation of oil from water, eliminating these drawbacks.

In the present invention, paraffinic hydrocarbons with a specific gravity of less than 0.8 are added as extractive solvents to waste water containing fats and oils, together with inorganic or organic coagulants. This mixture is then stirred and allowed to stand; the floating oil-containing scum is then removed so as to eliminate the fats and oils from the waste water, and the resulting treated water may be re-used as process water in the plant or discharged into rivers or sewage lines. The oil-containing scum removed from the waste water is distilled so as to separate the paraffinic hydrocarbons, namely the fats and oils extraction solvents, from the mixture. The distillation vapor is then condensed to recover the paraffinic hydrocarbons and the remaining residue is, after filtration, incinerated or discarded.

The characteristic features of the present invention are to use — as additives — paraffinic hydrocarbons of low specific gravities together with coagulants so as to break the emulsion and to separate the fats and oils from the waste water quickly and effectively in the form of large floating flocs through their synergistic action with the aid of stirring, and to recover reusable paraffinic hydrocarbons with ease by distillation from the oil-containing floating scum.

The purpose, characteristics, and advantages of the present invention are well illustrated in the following example, referring to the numbered drawing attached.

BRIEF DESCRIPTION OF THE DRAWING

This FIGURE represents one example of the process flow sheet of the present invention for the separation of oil from water.

DESCRIPTION OF THE PREFERRED EMBODIMENT

1. Fat- and oil-containing waste water discharged from a plant is sent to the original waste water storage pool 2 through the drain pipe 1 and stored.

2. Certain volume of the waste water stored in the above original waste water storage pool 2 is pumped by pump 3 into the treatment vessel 4, and an appropriate amount of paraffinic hydrocarbons of low specific gravity, namely the fats and oils extracting solvent, is added from the solvent tank 6 by manipulating valve 5. (Although such paraffinic hydrocarbons as n-hexane with a specific gravity of less than 0.8 are most desirable, other hydrocarbons with a specific gravity of less than 0.8, such as cyclohexane, pentanes, or octanes, can also be used effectively.)

3. As soon as the above paraffinic hydrocarbons are introduced, the stirrer 7 fitted to the treatment vessel 4 is started, and after an appropriate time, a certain amount of coagulant is added with stirring from the coagulant tank 9 through pump 8. (An organic coagulant such as E. C. Flock [Trade Name: Refer to Japanese Patent Early Disclosure No. 102782/1973] of suitable composition is highly recommendable. It is obtained by dissolving the condensation products of benzaldehyde or its derivatives with poly-alcohols containing four or more hydroxyl groups, such as dibenzylidene sorbitol, into a polar organic solvent together with a surface active agent, and further dispersing the solution so prepared homogeneously into water. However, other organic coagulants consisting of water-soluble longchain high polymers containing functional groups such as carboxyl groups, amide groups, or amino groups, and other inorganic coagulants such as aluminum sulfate and iron salts, and poly-aluminum chloride can also be used.)

4. After a short while, agitation is stopped and the mixture is allowed to stand for a certain period of time. Through such treatment, the fine paraffinic hydrocarbon particles formed by agitation are adsorbed over the de-emulsified fats and oils in the waste water, and they move upward in the form of bulky flocs under the action of the coagulants to form well-defined layers, namely the oil-containing scum 10 and the treated water 11. In this case, the floating behavior of the oil-containing scum is greatly affected by the specific gravity of the solvent paraffinic hydrocarbons. When the specific gravity exceeds 0.8, the floating of the oil-containing scum becomes extremely slow and layer formation requires a long time. Therefore, the use of paraffinic hydrocarbons with a specific gravity of less than 0.8 is desirable from the standpoint of operational efficiency.

5. When the pH in the original waste water storage pool 2 falls in the acidic range, the pH value must be adjusted after transfer into the treatment vessel 4 by the addition of an appropriate amount of aqueous hydroxide from the neutralizer tank 13 through the pump 12.

6. When layer separation is completed in the first run as described, valve 14 is opened in order to withdraw the treated water 11 in the treatment vessel 4 into the treated water pool 16 until the floating oil-containing scum 10 reaches the level of detector 15, and again a certain volume of the waste water in the original waste water pool 2 is charged into treatment vessel 4 through pump 3 to repeat the same treatment described above. This treatment is repeated five to seven times.

7. When the oil-containing scum 10 in the treatment vessel 4 reaches a certain thickness, the treated water, which is continuously circulating between the treated water pool 16 and the condenser 19 through pump 18, as will be described later, is introduced into the bottom of the treatment vessel 4 by opening valve 17 so as to raise the floating oil-containing scum 10 until the scum overflows into chamber 20 attached to the top portion of the treatment vessel 4.

8. The oil-containing scum is then withdrawn into the distillation vessel 21 and the treated water already pumped into treatment vessel 4 is again withdrawn back into the treated water pool 16 by opening valve 14. This treated clean water may then be discharged through the valve 22 as desired.

In the layer separation treatments described above, the agitation speeds and the agitation times after the addition of the solvent, paraffinic hydrocarbon, and coagulant affect the separation and operation efficiencies to a considerable extent. In experiments conducted by the present inventor, a waste water sample containing a detergent consisting of surface active agents, grinding sand, and cutting oil as contaminants, as shown below, was used.

| 1. Fats and Oils | 479 PPM |
| 2. Chemical Oxygen Demand | 126 PPM |
| 3. Biochemical Oxygen Demand | 143 PPM |
| 4. Suspended Substances | 180 PPM |
| | (grinding sand, dust) |

A 150 litre portion of the waste water was transferred into the treatment vessel 4 over a period of one minute, and during this period, 2 litre of n-hexane was introduced over a period of three seconds. The rotation speed of the agitator 7 and the agitation time were adjusted and the mixing behavior of the waste water and n-hexane was observed as summarised in Table 1, as follows:

Table 1

| Rotation Speed R.P.M. | 200 | 300 | 400 | 500 | 600 | 700 | 800 | 900 | 1000 | 1200 |
|---|---|---|---|---|---|---|---|---|---|---|
| Rotation Time, Sec. | | | | | | | | | | |
| 10 | P | P | P | P | P | P | P | P | P | P |
| 30 | P | P | P | P | G | G | G | G | G | G |
| 45 | P | P | P | FP | G | G | G | G | G | G |
| 60 | P | P | P | FP | G | G | G | G | G | G |
| 90 | P | P | P | FP | G | G | G | G | G | G |
| 120 | P | P | P | FP | G | G | G | G | G | G |
| 150 | P | P | P | G | G | G | G | G | G | G |
| 180 | P | P | P | G | G | G | G | G | G | G |

P = Poor     FP = Fairly Poor     G = Good

Note 1:
As judged by observation of the appearance.
Note 2:
In the Table, "P" indicates the case where n-hexane and the waste water remained as two independent phases and through mixing was not effected, or the case where the formation of gelatin-like colloids in the n-hexane extract was essentially nil or extremely small (of the order of 1/300 of the total waste water).
Note 3:
"FP" indicates the case where n-hexane remained as an independent phase at a level of 1/100 to 1/200 of the total waste water and thorough mixing was not effected.
Note 4:
"G" indicates the case where n-hexane was thoroughly mixed and a large amount of colloids (colloid formation of the order of 1/50 of the total waste water) was formed.
Note 5:
The colloids contained 4–5 times their weight of water.

The results indicate that thorough mixing of the paraffinic hydrocarbon can be fully effected by running the agitator 7 over a period of 30–60 seconds at a speed of 600–1,200 R.P.M.

Next, after the addition of n-hexane as described, the agitator 7 was operated at 750 R.P.M. for one minute, and into the 150 litre portion of the mixture thus obtained, 200 cc of E.C. Flock was added over a period of 30 seconds with stirring by the agitator 7 at 600–1,000 R.P.M. The agitation time after the addition was changed, and the mixture was allowed to stand for five minutes before observing the floating behaviour of the oil-containing scum, as shown in Table 2.

Table 2

| Rotation Speed, R.P.M. Time, Sec. | 600 | 700 | 800 | 1,000 |
|---|---|---|---|---|
| 10 | Large amount of suspended matter 112 PPM | Large amount of suspended matter 97 PPM | Large amount of suspended matter 105 PPM | Small amount of suspended matter 79 PPM |
| 20 | Almost complete flotation 51 PPM | Almost complete flotation 60 PPM | Almost complete flotation 63 PPM | Almost complete flotation 47 PPM |
| 30 | '' 18 PPM | '' 20 PPM | '' 11 PPM | '' 52 PPM |

Table 2-continued

| Rotation Speed, R.P.M. Time, Sec. | 600 | 700 | 800 | 1,000 |
|---|---|---|---|---|
| 40 | " | " | " | " |
|  | 15 PPM | 24 PPM | 12 PPM | 46 PPM |
| 60 | " | " | " | " |
|  | 18 PPM | 21 PPM | 10 PPM | 67 PPM |
| 90 | " | " | " | " |
|  | 21 PPM | 17 PPM | 16 PPM | 62 PPM |
| 120 | " | " | " | Some suspended matter 70 PPM |
|  | 17 PPM | 23 PPM | 18 PPM |  |
| 180 | " | " | " | Large amount of suspended matter 130 PPM |
|  | 19 PPM | 26 PPM | 71 PPM |  |
| 240 | " | " | " | Large amount of suspended matter 180 PPM |
|  | 43 PPM | 37 PPM | 51 PPM |  |

Note 1:
Rotation speed indicates revolutions per minute of agitator 7.
Note 2:
Time indicates the time after the addition of the coagulant until the cessation of agitation.
Note 3:
Judgement was based on observation of the appearance after allowing the sample to stand for 5 minutes after stopping agitation and was also based on the weight of suspended matter (mainly grinding sand) in the water collected after separating the floating oil-containing scum by means of a separating funnel from the treated water and filtering the water.

The results indicate that, after the addition of the coagulant, agitation for 30–60 seconds at 600–800 R.P.M. was sufficient, and that high speed agitation above 1,000 R.P.M. or agitation for longer than 180 seconds even in the optimum agitation speed range of 600–800 R.P.M. tended to break up the floc, so that no satisfactory flocculation of oil-containing scum was effected.

Based on the results described above, the optimum agitation speed and time after the addition of the solvent and coagulant are as follows:

1. Rotation speed of agitator.  600–800 R.P.M.
2. Agitation time from the end of solvent addition up to the beginning of coagulant addition.  about 60 sec.
3. Time from the end of coagulant addition up to the cessation of agitation  30–60 sec.

Thus the fats and oils in the waste water are fully separated and rapidly floated to effect layer separation of the treated water and the oil-containing scum.

The oil-containing scum transferred into the distillation vessel 21 was heated externally by steam and distilled at about 65°C, and the paraffinic hydrocarbons contained therein were vaporized into the condenser 19 to be cooled by treated water supplied from treated water pool 16 and condensed before returning to solvent tank 6 for recycling. When the oil-containing scum from which the paraffinic hydrocarbons had been removed reached a certain volume as detected by detector 23, it was transferred into filtration basket 25 through valve 24 and converted into a cake containing about 80% water for subsequent incineration or discarding. The water obtained by filtration was returned to the original waste water storage pool 2 for repeated treatment.

EXAMPLE

A 150 litre portion of the original waste water containing such contaminants was transferred into the treatment vessel in 60 seconds and during this period of time, 20 litre of n-hexane was added in 3 seconds, and the mixture was agitated for 60 seconds at a speed of 700 R.P.M. by means of an agitator. While the mixture was being agitated, 200 cc of E.C Flock was introduced over a period of 30 seconds after its addition agitation at the same speed was continued for 30 seconds and then stopped. After allowing the mixture to stand for 5 minutes, the treated water was withdrawn to the treated water pool, the same set of treatments was repeated 5 times in a similar manner and the treated water collected in the treated water pool was analyzed, with the results shown in the following table:

|  | Analytical Item | Oily Matter | Suspended Solids | pH | Turbidity | Color | COD |
|---|---|---|---|---|---|---|---|
| EXAMPLE 1 | Original Waste Water | 30,738 PPM | 334 PPM | 6.5 | 7,500 PPM | Milky white, non-transparent | 345.7 PPM |
|  | Treated Water | 1.1 PPM | 9.3 PPM | 8.5 | 1 PPM | Colorless, transparent | 14.9 PPM |
| EXAMPLE 2 | Original Waste Water | 2,923.8 PPM | 190 PPM | 6.8 | 7,500 PPM | light yellow, non-transparent | 13,186.8 PPM |
|  | Treated Water | 1.8 PPM | 7 PPM | 7.2 | 2 PPM | Colorless, transparent | 36.0 PPM |
| EXAMPLE 3 | Original Waste Water | 12,115.8 PPM | 175 PPM | 8.5 | 7,500 PPM | Bluish grey, non-transparent | 11,388.6 PPM |
|  | Treated Water | 1.6 PPM | 18 PPM | 7.3 | 2 PPM | Colorless, transparent | 47.0 PPM |
| EXAMPLE 4 | Original Waste Water | 31,269.0 PPM | 248 PPM | 6.6 | 470 PPM | Reddish brown, non-transparent | 162.7 PPM |
|  | Treated Water | 2.1 PPM | 6 PPM | 7.8 | 1 PPM | Colorless transparent | 4.3 PPM |

As is evident from the results reported above, using the method of the present invention, waste water containing oily matter at a level, for example, of some tens of thousand PPM or more can be treated compact equipment within an extremely short period of time to reduce the oil content of the treated water to 1 – 2 PPM. Furthermore, the volume of oil-containing scum is small and is obtained in a form easy to handle and suitable for subsequent treatment. In addition, the paraffinic hydrocarbons used as extracting solvents for fats and oils can readily be recovered by distilling the oil-containing scum so as to make recycling possible, thus reducing operating costs. Moreover, the whole operation is so simple that no specific knowledge of chemistry is required.

Although representative examples of the achievement of the present invention have been described above, it is evident that modifications can be made without departing from its principles. It should thus be emphasized that the following patent claims are to include any such modifications of the present invention involving processes essentially identical with or similar to the ones disclosed in the present invention so as to produce results essentially identical with those attained by the present invention.

What is claimed is:

1. A method of separating oil from industrial waste water, comprising the steps of introducing into a treatment vessel industrial waste water which contains fat and oil at a level of about 100 parts per million to tens of thousands parts per million; agitating the waste water in said treatment vessel introducing paraffinic hydrocarbons with a specific gravity of less than 0.8 as a fat-and oil-extracting solvent agent into the waste water, and also a coagulant, in the course of said agitating step so that a layer of oil-containing scum forms on top of a body of treated clean water, said solvent agent being introduced in an amount of between 0.001 – 10% of the oil and fat and said coagulant being introduced in an amount of between 0.1 – 50% of the waste water; withdrawing the treated clean water into a treated-water pool; floating the layer of oil-containing scum upwardly in the treatment vessel by charging treated clean water from the treated-water pool into the treatment vessel at the lower part thereof until the layer of scum overflows the treatment vessel; introducing the overflowing layer of oil-containing scum into a distillation vessel and distilling the solvent therein to vaporized the solvent and form a residual oil-containing scum; recovering the solvent for re-use by introducing the solvent vapor to a condenser for condensation; filtering the residual oil-containing scum, from which the solvent has been recovered, in a filter so as to separate a liquid component; and recycling said filtered liquid component into the waste water to be treated.

2. A method as defined in claim 1, wherein aqueous sodium hydroxide solution is added to the waste water introduced into said treatment vessel of pH adjustment prior to the subsequent treatment.

3. A method as defined in claim 1, wherein said treatment vessel is equipped with a means for detecting the position of the layer of oil-containing scum which descends during withdrawal of the treated clean water into the treated-water pool.

4. A method as defined in claim 3, wherein the treatment vessel is equipped around its external upper parts with a means of reception so as to collect and introduce into the distillation vessel the overflowing layer of oil-containing scum.

5. A method as defined in claim 4, wherein the condenser for condensing the solvent vapor evaporated in the distillation vessel makes use of the recycled treated clean water in the treated-water pool.

6. A method as defined in claim 5, wherein the distillation vessel is equipped with a means for detecting the volume of oil-containing scum collected therein, and for controlling the automatic delivery of the oil-containing scum to the filter.

7. A method of separating oil from industrial waste water, comprising the steps of introducing into a treatment vessel industrial waste water which contains fat and oil at a level between about 100 parts per million to tens of thousands parts per million; agitating the waste water in said treatment vessel; introducing into the waste water in the course of said agitating step paraffinic hydrocarbons with a specific gravity less than 0.8 as a fat and oil extracting solvent agent in an amount of between 0.001–10% of the oil and fat, and a coagulant in the amount of between 0.1–50% of the waste water, so that a layer of oil-containing scum forms on top of a body of treated clean water said coagulant being prepared by homogeneously dispersing into water under agitation a solution of a polar organic solvent containing a surface-active agent together with a condensation product of benzaldehyde and sorbitol; withdrawing the treated clean water into a treated-water pool; floating the layer of oil-containing scum upwardly in the treatment vessel by charging treated clean water from the treated-water pool into the treatment vessel at the lower part thereof until the layer of scum overflows the treatment vessel; introducing the overflowing layer of oil-containing scum into a distillation vessel and distilling the solvent therein to vaporized the solvent and form a residual oil-containing scum; recovering the solvent for re-use by introducing the solvent vapor to a condenser for condensation; filtering the residual oil-containing scum, from which the solvent has been recovered, in a filter so as to separate a liquid component; and recycling the filtered liquid component into the waste water to be treated.

8. A method as defined in claim 7, wherein n-hexane with a specific gravity of less than 0.8 is used as the paraffinic hydrocarbon.

9. A method as defined in claim 8, wherein the residual oil-containing scum from which the paraffinic hydrocarbons have been recovered is filtered for subsequent handling in the form of a cake.

* * * * *